United States Patent
Takamatsu et al.

[15] 3,680,358
[45] Aug. 1, 1972

[54] METHOD FOR DETERMINING TRANSITION TEMPERATURE OF DIELECTRIC

[72] Inventors: Toshiaki Takamatsu, Tokyo; Eiichi Fukada, Saitama-ken, both of Japan

[73] Assignee: Rikagaku Kenkyusho, Saitama-ken, Japan

[22] Filed: July 15, 1970

[21] Appl. No.: 55,098

[52] U.S. Cl. ..................................73/17, 324/61 R
[51] Int. Cl. ............................................G01n 25/04
[58] Field of Search ..............................73/17; 324/61

[56] References Cited

UNITED STATES PATENTS 3,315,518  4/1967  Charlson et al..............73/336.5

Primary Examiner—Richard C. Queisser
Assistant Examiner—Herbert Goldstein
Attorney—Bucknam and Archer, Jesse D. Reingold, Robert R. Strack and Henry A. Marzullo, Jr.

[57] ABSTRACT

A method for determining transition temperature of a dielectric such as low molecular weight material for example fats, oils, waxes and linear hydrocarbons and high molecular weight materials for example polyvinylidene fluoride, polyethylene, polyvinylchloride, polymethylacrylate and polystyrene which comprises polarizing the dielectric under a high static electric field to form electret, then measuring the depolarization current as temperature thereof being increased, thereby to easily and accurately determine various transition temperatures of the dielectric from the ranges and peaks of the depolarization current.

3 Claims, 11 Drawing Figures

METHOD FOR DETERMINING TRANSITION TEMPERATURE OF DIELECTRIC

This invention relates to a method for determination of transition temperature of dielectrics, and more precisely it relates to a novel method for determination of various transition temperatures of a dielectric such as low molecular weight materials for example, fats, oils, waxes and linear hydrocarbons, and high molecular weight materials for example, polyvinylidene fluoride, polyethylene, polyvinyl chloride, polymethyl acrylate and polystyrene and likes.

More particularly this invention relates a method for determination of transition temperature which comprises polarizing a dielectric in an static electric field to form electret, and then raising the temperature thereof thus recording the generated depolarization current, and determining various transition temperature from the degree and peak of the depolarization current.

In general, when heating dielectric materials, for example, low molecular weight materials such as fats, oils, waxes and linear hydrocarbons or high molecular materials such as polyvinylidene fluoride, polyethylene, polyvinylchloride, polymethyl methacrylate, and polystyrene, from low temperatures to elevated temperatures, their properties are changed from a temperature to other temperature. The temperatures at which the properties transfer, that is, transition temperatures depend on various variables such as kinds of materials, quantities and kinds of plasticizers or additives, processing procedures, and degree of heat treatment, therefore, the transition temperature is an important factor to be noticed for processing or molding these dielectrics.

The transition temperature includes various ones such as (1) a temperature at which a local movement of molecular chains begins in a non-crystalline portion, (2) a temperature at which the main chain in a non-crystalline portion begins thermal vibration in large amount (referred to the glass transition temperature), (3) a temperature at which rotary movement of molecular chains in crystal begins, and (4) a temperature at which a crystal begins to melt (melting point).

Ordinarily, for determining such transition temperatures there has been employed thermal analysis by means of a dilatometer, a calorimeter, a differential thermometer or a differential calorimeter; and alternately determination of viscoelasticity, determination of dielectric relaxation, or determination of nuclear magnetic resonance has been employed.

The present invention relates to a novel determination method based on a principle quite different from the conventional ones, and provides a novel and effective method which can determine various transition temperatures of dielectrics described above, readily, sensitively and accurately. Another purpose of the invention is to provide a determination method able to clarify the critical transition temperature range which has been considered as observational errors, and to be able to read the values readily and directly.

The above-described and other objects are accomplished according to the present invention which comprises applying a static electric field to a dielectric at an optional given temperature, thereby polarizing it to form electret, then removing the electric field, followed by allowing the temperature of the material to raise or heating the material while detecting the depolarization current as a function of temperature.

The dielectrics described here may be of either polar or non-polar, and either crystalline or amorphous: in any case, ions of impurities, permanent dipoles or electrons existing in the material are polarized and frozen in various traps in the material, and when the temperature is raising, they are unbound from the traps and move: thus, they are observed as depolarization current from the outside.

The present inventors have carried out various studies as follows: At first a dielectric to be examined is placed between two electrodes. Thus an ordinarily liquid dielectric or melted dielectric is filled between two electrodes and alternately a dielectric in form of film or plate is inserted between two electrodes: static electric field was applied at various given temperatures, and after cooling, the both electrodes were connected to an electrometer then, the temperature of the sample was again raised while depolarization current generated in the sample was recorded as a function of temperature. As the result, the present inventors found that the strength of the said depolarization current and the temperature range in which the peaks appeared varied depending on the samples, and that the temperature ranges of the peaks were well coincident with various transition temperature ranges obtained by conventional determination methods such as by means of determination of thermal expansion coefficient or differential thermal analysis of softening temperature.

According to this invention, transition temperature of any high molecular weight materials can be determined by cooling said material after applying an electric field at an optional given temperature, followed by removing the electric field and raising the temperature of the material again, and then detecting the generated depolarization current and recording it as a function of temperature, thus obtaining various transition temperatures from the maximum values shown in the said depolarization current.

When a dielectric is cooled with liquid nitrogen after applying an electric field at an elevated temperature near the melting point, there may be readily observed various transition temperatures in the range from about $-170°$ C to near the melting point; when cooling with liquid helium, the transition temperatures in the range higher than the temperature of liquid helium may be determined. Furthermore, since the sensitivity of electrometer can be greatly increased, the resolving power is improved, and thus, the temperature ranges showing various transition phenomena can be read directly with high accuracy in a recorder; and consequently, there may be resolved the transition temperature range which has not been clarified whether it depends on the determination error or not.

The present invention is explained in detail referring attached drawings.

Figure 5:
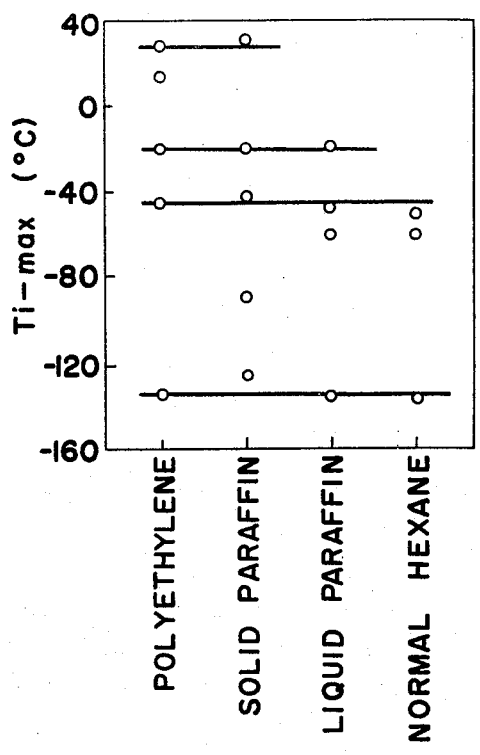
Figure 4:
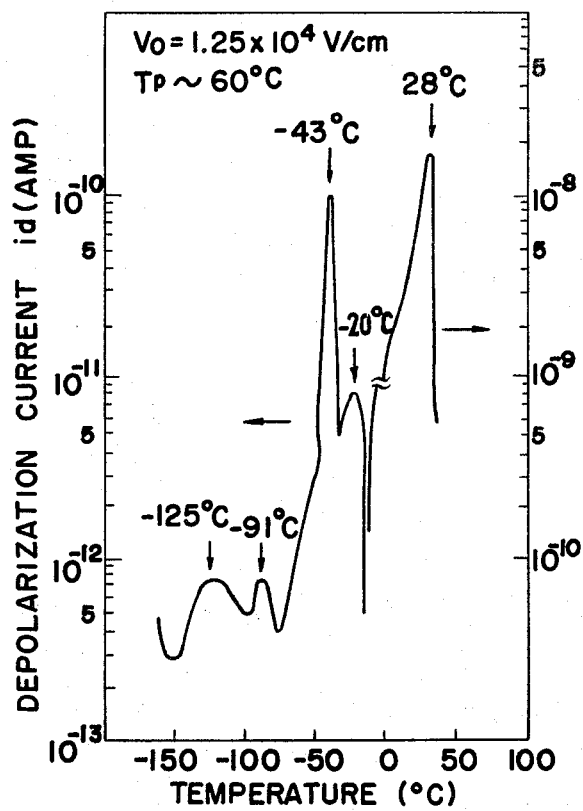
Figure 6:
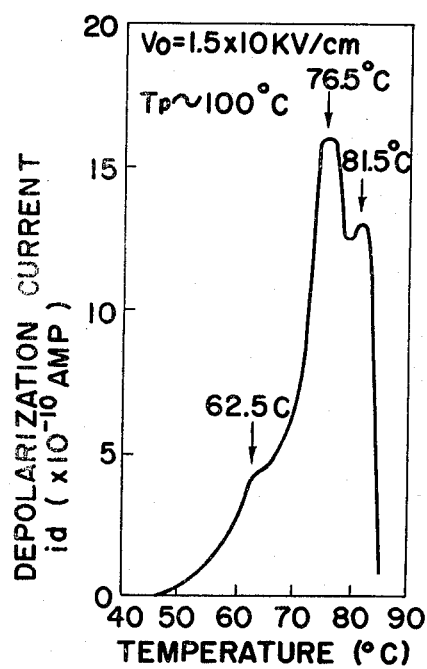
Figure 7:
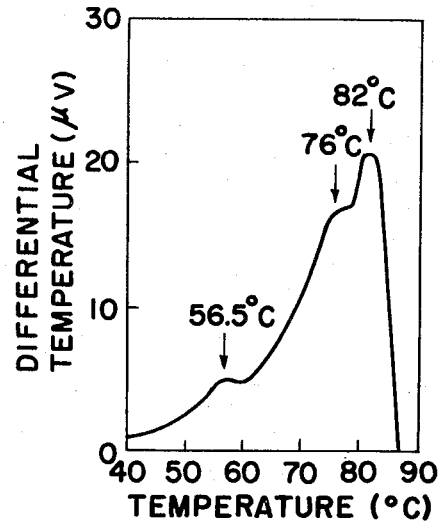
Figure 8:
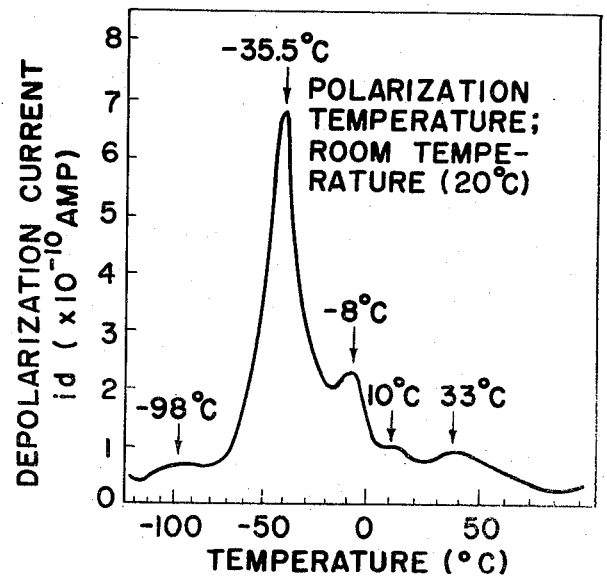
Figure 9:
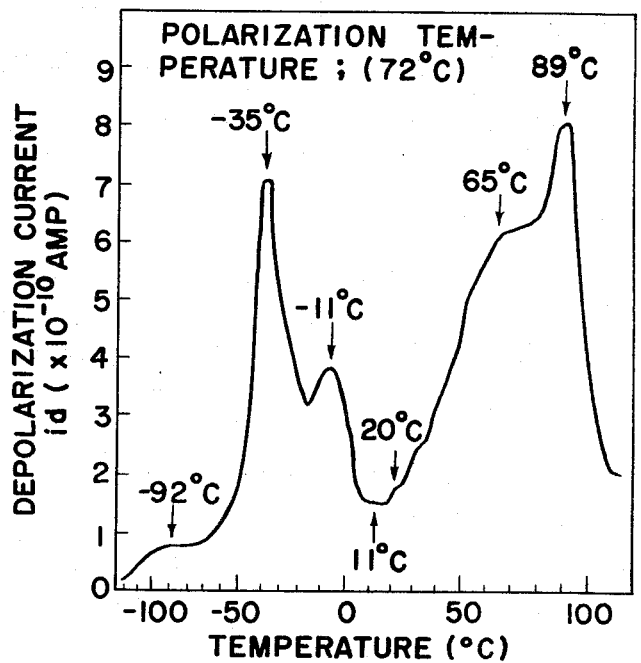
Figure 10:
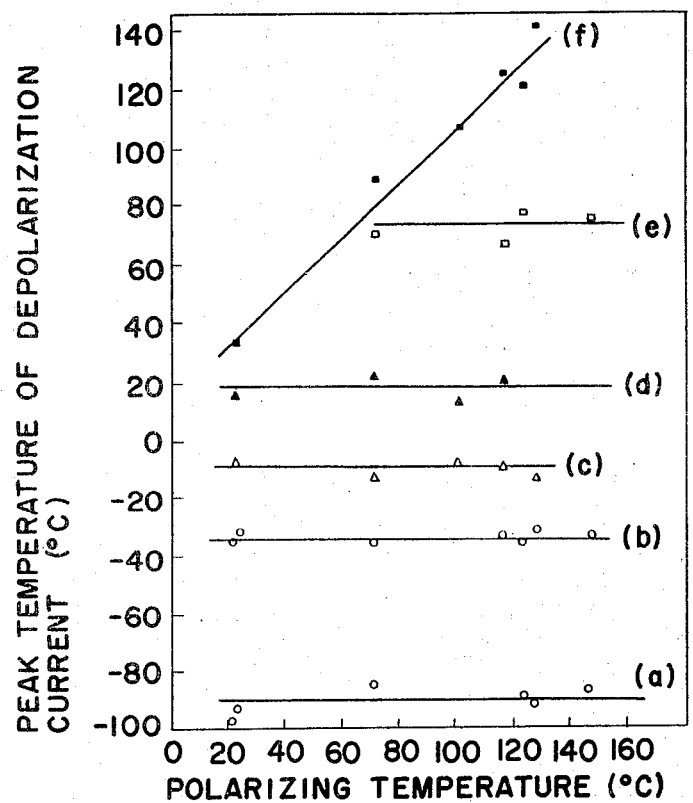
Figure 11:
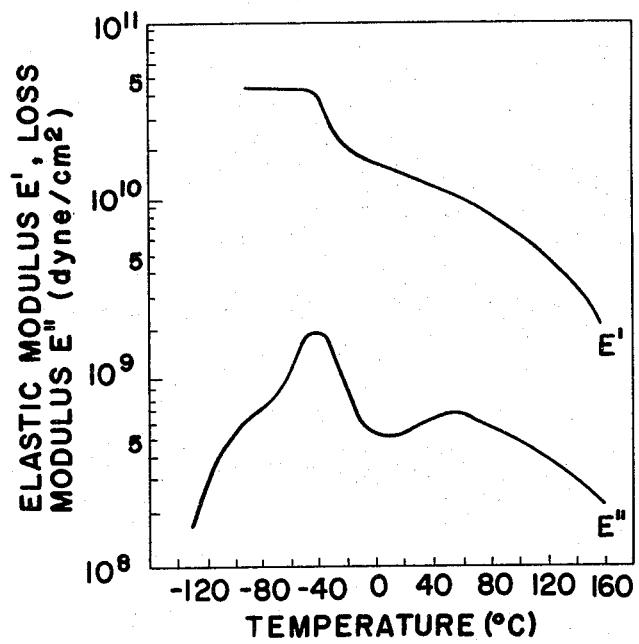

FIG. 4 to FIG. 6 show graphs obtained according to the present invention, FIG. 4 shows a relation of depolarization current vs. temperature when n-paraffin having the melting point 46.0° C is polarized at a temperature higher than the melting point thereof, FIG. 5 shows the temperatures at which the depolarization current of paraffin wax, fluid paraffin, and n-hexane reach the maximum, compared with those of polyethylene, a high molecular material, FIG. 6 shows a relation of the depolarization current vs. temperature as to carnauba wax;

FIG. 7 is a graph showing the relation of differential heat and temperature of carnauba wax;

FIG. 8 to FIG. 10 show graphs obtained by testing polyvinylidene fluoride and FIG. 8 shows the relation of the depolarization current vs. temperature when the polarization temperature is 20° C, FIG. 9 shows the relation of the depolarization current and temperature when the polarization temperature is 72° C, and FIG. 10 shows the relation of the temperature with the maximum depolarization current vs. polarization temperature; and FIG. 11 is a graph showing the relations of temperature vs. dynamic Young's modulus and loss modulus of polyvinylidene fluoride, obtained by determination of viscoelasticity.

Figures 1, 2:
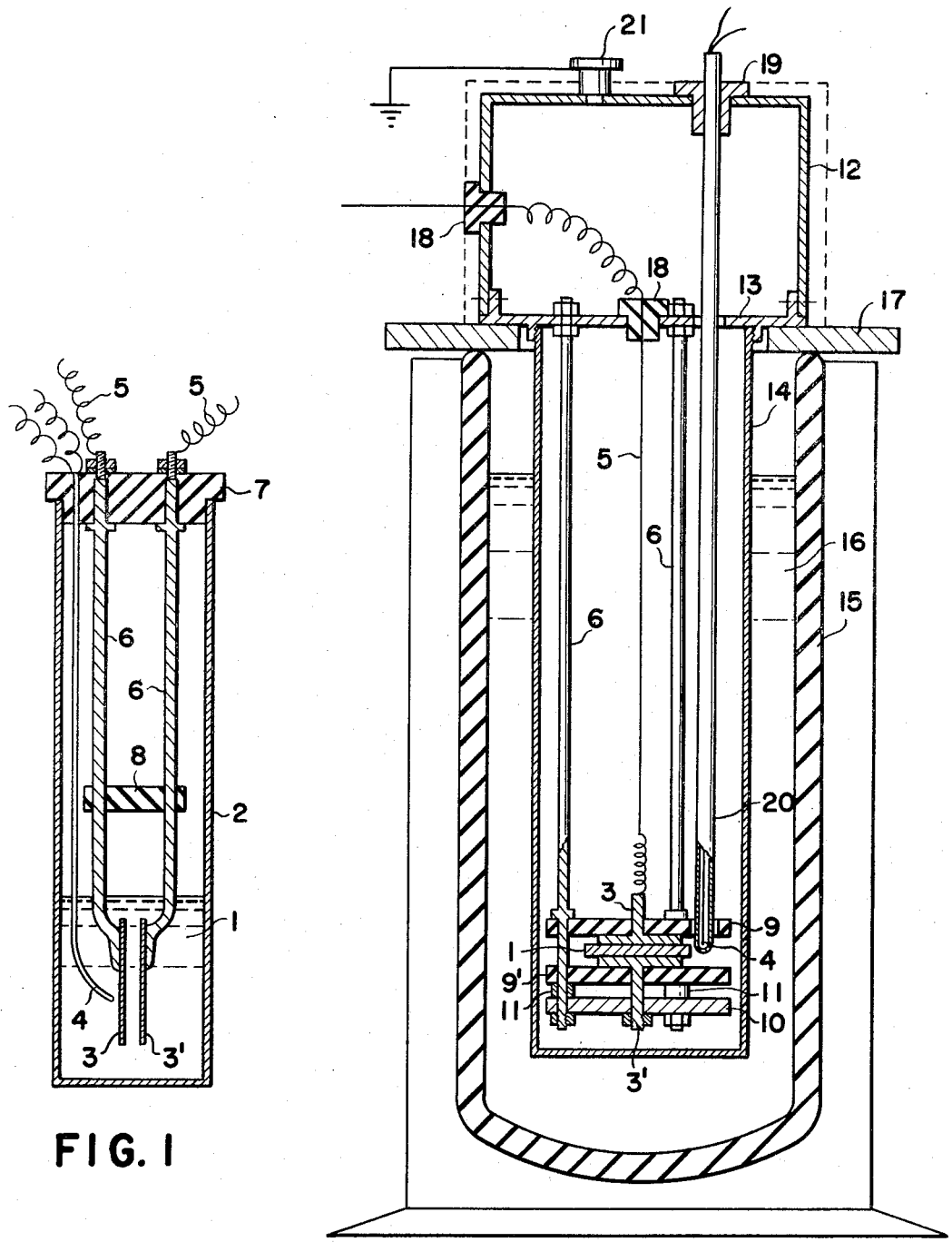
FIG. 1 shows longitudinal section of a device of the present invention for determining transition temperature of a liquid dielectric material.
FIG. 2 shows a similar device for film or plate dielectric material.

FIG. 1 and FIG. 2 are devices exemplifying the performance of the invention. FIG. 1 shows a device for determination of an ordinary liquid dielectric sample such as fats, oils and waxes, and particularly it is suitable for determination of low molecular materials. FIG. 2 is for determination of dielectric sample in a film or plate form, particularly it is suitable for determination of high molecular materials such as polyvinylidene fluoride and polyethylene. In FIG. 1, a sample 1 is put between paralleled electrode plates in a glass vessel 2, which is heated or cooled indirectly from the outside of the vessel, for instance, on heating it is inserted into a heating furnace, and on cooling it is inserted into a Dewar vessel comprising a freezing mixture such as liquid nitrogen or dry ice, but they are not shown in this figure. The determination operation may become easier when using a thermostat which can be controlled over a range from low to high temperatures. 4 is a thermocouple for determining the temperature of the sample, and connected to the X-axis of the X-Y recorder. (See FIG. 3). A lead wire 5 connected to the electrode is connected to a terminal for applying electric voltage and an electrometer (see FIG. 3) for applying the electric voltage and determining the depolarization current of the sample, respectively. 6 is a supporting bar of the paralleled plate electrode 3; 7 and 8 are a flange and a guide of the supporting bar, which are made of an insulating material such as Micalex. In FIG. 2, the sample 1 is pinched between the electrodes 3, 3' with pinching plates 9, 9' of an insulating material, and supported to the bottom plate 13 of the electric insulating box 12 with a supporting bar 6, a supporting plate 10 and a collar 11. The sample is positioned inside a sample column 14, which protects the sample, and simultaneously the sample is heated or cooled indirectly via the column. 15 is a Dewar vessel, in which a freezing agent 16 (such a liquid nitrogen or dry ice) is contained, and the sample is cooled by the agent.

On heating, the sample is inserted into a heating furnace, which is not shown here. The determination can be easily performed when using a thermostat controllable from low to high temperatures, similar to the apparatus of FIG. 1. 4 is a thermocouple for determining the temperature of the sample, and connected to the X-Y recorder. (See FIG. 3). A lead wire 5 connected to the electrode 3 is connected to a terminal for applying the electric voltage and an electrometer for determining the depolarization current of the sample (see FIG. 2). 17 is a heat insulating material (asbestos), which prevents elimination of heat. 18 is an insulating bush; 19 is a holder of a thermocouple protecting insulating bush; 19 is a holder of a thermocouple protecting tube 20; 21 is an earth terminal. By wrapping the electric insulating box 12 with a heat insulating material as shown by a dotted line, the sample is heated or cooled more effectively.

Figure 3:
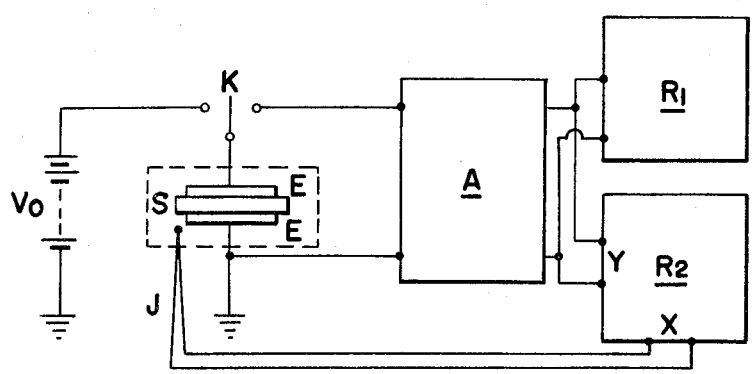
FIG. 3 is a block diagram showing an example of a determination circuit for performance of this invention.

FIG. 3 is a block diagram illustrating an example of the determination circuit in the performance of the present invention.

The sample is polarized when the voltage $V_o$ is applied to the sample S via the electrode E by switching on the switch K to the side 1. The sample is depolarized when the switch K is turned to the side 2. The depolarization current of the depolarized sample is detected by a vibrating reed electrometer A, and the current part is recorded by a recorder recording with time $R_1$ and the Y-axis of the X-Y recorder $R_2$. In the X-axis of the X-Y recorder the electromotive force of the thermocouple J is recorded to see the temperature of the sample: thus the relation of the current vs. temperature can be obtained at once. By integrating the depolarization current $i_d$ recorded by the recorder recording with time with the whole time $t$, the whole emitted electric charge $Q_d$ can be obtained as follows:

$$Q_d = \int_0^\infty i_d dt$$

There may be performed precise analysis on the transition temperatures and on the structure of molecules based on $Q_d$.

The present invention is explained by the examples using the apparatuses of FIG. 1 and FIG. 2 described above.

EXAMPLE 1

As a sample, paraffin wax having the melting point of 46.0° C was heated to melt, and poured into the apparatus of FIG. 1, which was heated at 60° C, and then cooled to nearly −160° C with liquid nitrogen while applying the direct electric field of $5 \times 10^3$ v/cm; the depolarization current ($i_d$) was recorded as a function of temperature by the X-Y recorder of FIG. 3, and the result shown in FIG. 4 was obtained. The temperature-raising rate was about 1° C per minute. As clearly seen in this figure, the depolarization current ($i_d$) shows some peaks (shown by arrows) in some temperature ranges.

Fluid paraffin and n-hexane were poured into the apparatus of FIG. 1, to which an electric field of $5 - 6 \times 10^3$ v/cm was applied at a room temperature; then they were cooled with liquid nitrogen. The temperatures at which the depolarization current reached the maximum (Ti - max) are shown in FIG. 5, together with results obtained with polyethylene and paraffin wax. As clearly seen in the figure, since paraffins are saturated hydrocarbons being different from polyethylene only in its molecular weight, these low molecular weight paraffins show the peaks of the depolarization current at temperatures near the transition temperatures obtained from those of the maximum in the depolarization current of polyethylene: accordingly, it must be considered that the maximum temperature in the depolarization current of these low molecular weight materials will relate to some molecular movement, a transition phenomenon, and thus, it will be a new key to analyze the thermal motion of the molecule.

EXAMPLE 2

Curnauba wax known as a waxy material was heated to melt and poured into the apparatus of FIG. 1, to which an electric field of $1.5 \times 10^4$ v/cm was applied at a temperature higher than the melting point, and then it was cooled to room temperature; after removing the electric field the sample was heated again; the induced depolarization current ($i_d$) and the temperature are shown in FIG. 6. $i_d$ shows three peaks in the temperature range from room temperature to the melting point. FIG. 7 shows the result of the differential thermal analysis: in three temperature ranges from room temperature to the melting point, the maximum of heat absorption is recognized. As seen in this result, the maximum temperature of the depolarization current in FIG. 6 is well coindicent with that in the differential thermal analysis.

EXAMPLE 3

A film of polyvinylidene fluoride of 0.32 mm thick and 3.5 cm long × 3.5 cm wide prepared from melted material was employed as a sample; silver paste or Akadak was applied in a circle of 2.5 cm diameter on the film surface for eliminating the error due to air gap. The sample thus prepared was pinched between the electrodes in the apparatus of FIG. 2, and a direct field of $3.9 \times 10^4$ v/cm was applied at room temperature (20° C). As applying the field for about 30 minutes, the sample was cooled with liquid nitrogen to nearly $-150°$ C, and then the electric field was removed. The polarized sample was heated with the rate of about 1° C per minute and the depolarization current $i_d$ and the temperature T were observed by the circuit shown in FIG. 3; the curve shown in FIG. 8 was obtained. $i_d$ shows maximum values (shown by arrows) in some temperature ranges. FIG. 9 is a curve showing the relation of $i_d$ vs. T, when polarizing the same sample at the polarization temperature of 72° C under the same conditions as described previously. In this figure, the peaks of $i_d$ are recognized at near 65° C and at a point slightly higher than the depolarization temperature, which are not seen in FIG. 8. FIG. 10 was obtained by plotting the relation of the depolarization temperature vs. the temperature at which $i_d$ becomes maximum. It is seen in this figure that there are bands (a), (b), (c), (d) and (e) wherein the temperature ranges of $i_d$ peaks are always almost constant in spite of varying the depolarization temperature from room temperature to 160° C and band (f) wherein the maximum points transfer to the higher temperature ranges, proportional to the depolarization temperatures.

As discussing the above results, the followings are found out: (1) $i_d$ in the band (a) becomes maximum at a temperature near $-90°$ C to $-95°$C; it will correspond to the local twist or rotary movement of the molecular chain in the amorphous portion: (2) in the band (b) $i_d$ is at maximum at $-35°$ C; it is well coincident with the glass transition temperature by the dilatometry method: (3) the band (e) seen at near 60° - 70° C corresponds to the crystalline dispersion of the polymer and coincides with the measurement of dielectric relaxation (showing dispersion at 70° C): (4) from FIG. 11 showing the variations of dynamic Young modulus E' and loss modulus E'' with temperature as to the same sample by means of a viscoelastometer (frequency: 30 c/s), temperatures at which E'' becomes maximum are obtained, and they are well coincident with the transition temperatures obtained with the depolarization temperatures of 20° C and 101° C, as seen in Table 1: (5) as some peaks appear in the temperature ranges in which they are not seen by ordinary methods, for instance, the bands (c), (d) and (f) in FIG. 10, the behavior of molecular movement will be newly resolved from such new transition temperature ranges.

TABLE 1

| | Visco-elasticity | Present invention | |
|---|---|---|---|
| Frequency | 30 c/s | | |
| Polarization temperature | | 20°C | 101°C |
| Strength of the electric field | | $3.9 \times 10^4$ v/cm | " |
| Maximum | °C | °C | °C |
| 1 | −94 | −98 | |
| 2 | −35 | −35.5 | −35 |
| 3 | | −8 | −8 |
| 4 | | 10 | 13.5 |
| 5 | | 35 | |
| 6 | 60 | | 63 |
| 7 | | | 106 |

EXAMPLE 4

The similar experiment as described in Example 3 was performed with the samples of low density polyethylene (Alkathene) and high density polyethylene (Sholex 6,000-50), and the results shown in Table 2 (a) and (b) were obtained. There is also listed the temperature at which the dynamic loss modulus E'' obtained in determination of viscoelasticity becomes maximum, for comparison.

TABLE 2a

| | Visco-elasticity | Present invention | | |
|---|---|---|---|---|
| Frequency | 30 c/s | | | |
| Polarization temperature | | 20°C | 77°C | 96°C |
| Strength of the electric field | $8 \times 10^4$ v/cm | $4 \times 10^4$ v/cm | | $2.5 \times 10^4$ v/cm |
| Maximum | °C | °C | °C | °C |
| 1 | −135 | −150 | −132 | |
| 2 | | −59 | −69 | −72 |
| 3 | | −55 | −51 | |
| 4 | −20 | −25 | −29 | −27 |
| 5 | | −8 | −15 | −12 |
| 6 | | | 0 | 0 |
| 7 | 50 | | 23 | 27 |
| 8 | | | 81 | 101 |
| 9 | | | | 106 |

TABLE 2b

|  | Visco elasticity | Present invention | | | |
|---|---|---|---|---|---|
| Frequency | 30 c/s | | | | |
| Polarization temperature | | 20°C | 69°C | | 117°C |
| Strength of the electric field | | 4×10⁴ v/cm | 1×10⁴ v/cm | | 4×10⁴ v/cm |
| Maximum | °C | °C | °C | °C | °C |
| 1 | −113 | −158 | −150 | | −146 |
| 2 | −40 | −64 | −51 | | −56 |
| 3 | | −29 | −26 | | |
| 4 | | 16 | 14 | | 14.5 |
| 5 | | 39 | 22 | | |
| b | | | 34 | | |
| 7 | 70 | | | | 69 |

As clearly seen in above table, the temperature at which $i_d$ shows the peak is near the temperature range at which E'' becomes maximum under various polarization conditions. The temperature at which E'' shows the maximum value varies depending on the frequency of measurement, and it slides to the higher side with the higher frequency and to the lower side with the lower frequency. According to the method of the present invention, however, the determination is static, and the temperature of the maximum value transfers to the lower side by a few degrees or more than 10° than in the case of E''. As considering this point, the both results may be thought to be well coincident with each other.

Besides the above-described examples, higher alcohol, ester, fatty acid, which are main components of fats, oils and waxes, and polyvinyl chloride, polymethyl methacrylate and polystyrene were tested, and the obtained results were well coincident with the transition temperature obtained by the ordinary methods.

As precisely described previously, according to the method of the present invention, various transition temperatures of dielectrics can be readily determined accurately, and the transition phenomenon which has not been clarified by the ordinary methods may be resolved: thus the present invention is also useful for resolving the internal strain or structural change occurring on processing of dielectrics.

We claim:

1. A method for determining transition temperatures of a dielectric, which comprises the steps of applying an electric field to the dielectric to polarize same, cooling the dielectric while the electric field is applied thereto, removing the electric field from the cooled dielectric, heating the dielectric to depolarize same by emission of current, measuring the depolarization current emitted and the temperature of the dielectric during the heating thereof, and monitoring the values of depolarization current nd dielectric temperature measured to detect variations in depolarization current with temperature indicative of a dielectric transition temperature.

2. A method for determining transition temperatures of a dielectric, which comprises the steps of immersing a pair of parallel plate electrodes into a liquid state dielectric material, establishing an electric potential difference between said electrodes to apply an electric field to the dielectric to polarize same, cooling the dielectric while the electric field is applied thereto, removing the potential difference between said electrodes to remove the electric field from the cooled dielectric, connecting said electrodes to a current measuring means, heating the dielectric to depolarize same by emission of current, measuring with said current measuring means the depolarization current emitted by the dielectric, measuring the temperature of the dielectric during the heating thereof, and monitoring the values of depolarization current and dielectric temperature measured to detect variations in depolarization current with temperature indicative of a dielectric transition temperature.

3. A method for determining transition temperatures of a dielectric, which comprises the steps of positioning a layer of solid dielectric material between a pair of contact electrodes, establishing an electric potential difference between said electrodes to apply an electric field to the dielectric to polarize same, cooling the dielectric while the electric field is applied thereto, removing the potential difference between said electrodes to remove the electric field from the cooled dielectric, connecting said electrodes to a current measuring means, heating the dielectric to depolarize same by emission of current, measuring with said current measuring means the depolarization current emitted by the dielectric during the heating thereof, measuring the temperature of the dielectric during the heating thereof, and monitoring the values of depolarization current and dielectric temperature measured to detect variations in depolarization current with temperature indicative of the dielectric transition temperature.

* * * * *